United States Patent
Wittenberg et al.

(10) Patent No.: US 9,740,902 B2
(45) Date of Patent: Aug. 22, 2017

(54) APPARATUS FOR AND METHOD OF TRIGGERING ELECTRO-OPTICAL READING ONLY WHEN A TARGET TO BE READ IS IN A SELECTED ZONE IN A POINT-OF-TRANSACTION WORKSTATION

(75) Inventors: Carl Wittenberg, Water Mill, NY (US); Edward Barkan, Miller Place, NY (US); Chinh Tan, Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 510 days.

(21) Appl. No.: 13/308,848

(22) Filed: Dec. 1, 2011

(65) Prior Publication Data

US 2013/0141584 A1    Jun. 6, 2013

(51) Int. Cl.
    *G06K 7/10*    (2006.01)
(52) U.S. Cl.
    CPC ..... *G06K 7/10732* (2013.01); *G06K 7/10722* (2013.01); *G06K 7/10811* (2013.01); *G06K 7/10851* (2013.01); *G06K 7/10881* (2013.01); *G06K 2207/1012* (2013.01)
(58) Field of Classification Search
    CPC ........... G06K 7/10732; G06K 7/10851; G06K 7/10722; G06K 7/10881; G06K 7/10811; G06K 2207/1012
    USPC ............ 235/462.22, 462.41, 462.14, 462.01, 235/462.15
    See application file for complete search history.

(56) References Cited

U.S. PATENT DOCUMENTS

| | | | | |
|---|---|---|---|---|
| 5,256,865 A | * | 10/1993 | Wike et al. | 235/462.15 |
| 5,811,785 A | * | 9/1998 | Heiman | G06K 7/10584 235/462.3 |
| 8,033,472 B2 | | 10/2011 | Giebel et al. | |
| 2009/0218405 A1 | * | 9/2009 | Joseph | G06K 7/10732 235/462.42 |
| 2010/0252635 A1 | * | 10/2010 | Drzymala et al. | 235/462.41 |

(Continued)

FOREIGN PATENT DOCUMENTS

| | | | |
|---|---|---|---|
| WO | 2006060785 A2 | 6/2006 | |
| WO | WO 2006060785 A2 * | 6/2006 | ......... G06K 7/10732 |
| WO | 2010036277 A1 | 4/2010 | |

OTHER PUBLICATIONS

International Search Report and Written Opinion mailed Jul. 1, 2013 in counterpart PCT application No. PCT/US2012/062657.

*Primary Examiner* — Behrooz Senfi
*Assistant Examiner* — Maria Vazquez Colon
(74) *Attorney, Agent, or Firm* — Yuri Astvatsaturov

(57) ABSTRACT

Products associated with targets to be read by image capture are processed in a workstation having a window, a solid-state imager looking at a field of view extending through the window to a target to be imaged, and an illumination system for illuminating the field of view. A proximity system detects a product associated with the target in a selected zone outside the window. The proximity system has an infrared (IR) emitter for emitting IR light into an IR emission field, and an IR sensor for sensing return IR light within an IR detection field that intersects the IR emission field in the selected zone. A controller energizes the illumination system in response to the detection of the product in the selected zone, and processes return illumination light captured in the field of view by the imager.

20 Claims, 6 Drawing Sheets

(56) References Cited

U.S. PATENT DOCUMENTS

2011/0073652 A1\* 3/2011 Vinogradov ....... G06K 7/10732
                                                    235/462.08
2013/0026233 A1\* 1/2013 Chen .................. G06K 7/10722
                                                    235/440

\* cited by examiner

APPARATUS FOR AND METHOD OF TRIGGERING ELECTRO-OPTICAL READING ONLY WHEN A TARGET TO BE READ IS IN A SELECTED ZONE IN A POINT-OF-TRANSACTION WORKSTATION

FIELD OF THE DISCLOSURE

The present disclosure relates generally to an apparatus for, and a method of, triggering electro-optical reading of a target by, for example, illuminating the target only when the target to be read is in a selected zone in a point-of-transaction workstation.

BACKGROUND

Point-of-transaction workstations employing laser-based readers and/or imager-based readers have been used in many venues, such as supermarkets, department stores and other kinds of retail settings, as well as libraries and parcel deliveries and other kinds of public settings, as well as factories, warehouses and other kinds of industrial settings, for many years. Such workstations were often configured either as vertical slot scanners each resting on, or built into, a countertop and having a generally vertically arranged, upright window, or as bi-optical, dual window scanners each resting on, or built into, a countertop and having both a generally horizontal window supported by a generally horizontal platform and a generally vertically arranged, upright window supported by a generally upright tower. Such workstations were often operated to electro-optically read a plurality of symbol targets, such as one-dimensional symbols, particularly Universal Product Code (UPC) bar code symbols, truncated symbols, stacked symbols, and two-dimensional symbols, as well as non-symbol targets, such as driver's licenses, receipts, signatures, etc., the targets being associated with, or borne by, objects or products to be processed by, e.g., purchased at, the workstations.

A user, such as an operator or a customer, slid or swiped a product associated with, or bearing, the target in a moving direction across and past a respective window in a swipe mode, or momentarily presented, and steadily momentarily held, the target associated with, or borne by, the product to an approximate central region of the respective window in a presentation mode. The products could be moved relative to the respective window in various directions, for example, from right-to-left, or left-to-right, and/or in-and-out, or out-and-in, and/or high-to-low, or low-to-high, or any combination of such directions, or could be positioned either in contact with, or held at a working distance away from, either window during such movement or presentation. The choice depended on the type of the workstation, or on the user's preference, or on the layout of the venue, or on the type of the product and target. Return light returning from the target in the laser-based reader and/or in the imager-based reader was detected to generate an electrical signal indicative of the target. The electrical signal was then processed, and, when the target was a symbol, was decoded, and read, thereby identifying the product.

Early all imager-based, bi-optical workstations required about ten to twelve, or at least six, solid-state imagers having multiple, intersecting fields of view extending through the windows in order to provide a full coverage scan volume in front of the windows to enable reliable reading of the target that could be positioned anywhere on all six sides of a three-dimensional product. To bring the cost of the imager-based workstation down to an acceptable level, it was known to reduce the need for the aforementioned six to twelve imagers down to two imagers, or even one imager, by splitting the field of view of at least one of the imagers into a plurality of subfields of view, each additional subfield serving to replace an additional imager. These subfields also intersected each other in order to again provide a full coverage scan volume that extended above the horizontal window and in front of the upright window as close as possible to a countertop, and sufficiently high above the countertop, and as wide as possible across the width of the countertop. The scan volume projected into space away from the windows and grew in size rapidly in order to cover targets on products that were positioned not only on the windows, but also at working distances therefrom.

Each imager included a one- or two-dimensional, solid-state, charge coupled device (CCD) array, or a complementary metal oxide semiconductor (CMOS) array, of image sensors (also known as pixels), and typically had an associated illuminator or illumination assembly to illuminate the target with illumination light over an illumination field. Each imager also had an imaging lens assembly for capturing return illumination light reflected and/or scattered from the target, and for projecting the captured return light onto the sensor array. Each imager preferably operated at a frame rate of multiple frames per second, e.g., sixty frames per second. Each field of view, or each subfield, was preferably individually illuminated, and overlapped, by a respective illumination field and extended through the windows over regions of the product. Each imager included either a global or a rolling shutter to help prevent image blur, especially when the targets passed through the scan volume at high speed, e.g., on the order of 100 inches per second.

Preferably, to reduce power consumption, to prolong operational lifetime, and to reduce bright light annoyance to operators and customers, the illumination light was not emitted at all times, but was emitted in response to detection of return infrared light by an infrared-based proximity system. Such proximity systems were intended to detect infrared light reflected and/or scattered from a product entering the workstation. However, this was often not the case in practice.

The known proximity system included an infrared (IR) emitter operative for emitting IR light along an IR emission axis centrally located within an IR emission field, and an IR sensor for sensing the return IR light along an IR detection axis centrally located within an IR detection field. The known IR emitter and the IR sensor were typically positioned behind the upright window in the workstation such that the IR emission axis and the IR detection axis were generally in mutual parallelism and generally perpendicular to the upright window.

Since a small, dark-colored product will return a small amount of IR light, the known proximity system typically had a high triggering sensitivity, because the small, dark-colored product had to be detected even in the far field. However, a user standing in front of the upright window and wearing white clothing, for example, could falsely trigger the reading, because the known, highly sensitive, proximity system could not distinguish between IR light returning from the product, or from the user's clothing, or from any other item or person that happened to be in the IR emission field. As a result, items or persons outside the workstation, i.e., in the far field, could falsely trigger the reading.

In addition, the IR emission field and the IR detection field of the known proximity system were not well-defined. The intensity of the emitted IR light, for example, was greatest along the IR emission axis, and then decreased in directions radially of the IR emission axis. The peripheral edges of the IR emission field, however, were not sharp. As a result, items or parts of persons inside the workstation, but not in a selected zone, e.g., directly overlying the generally horizontal window, could also falsely trigger the reading.

In addition, the horizontal platforms of some bi-optical workstations were configured with different lengths as measured in a back-to-front direction away from the upright window. The known proximity system was not readily optimizable to work with both long and short platforms. Thus, if the known proximity system was designed to work with a long triggering volume to accommodate a long platform, and if the workstation had a short platform, then items or parts of persons could easily enter the long triggering volume and could falsely trigger the reading.

To counter such false triggering, it was known to reduce the output power of the IR emitter to thereby attempt to read only targets that were close to the upright window. However, this reduced the sensitivity of the proximity system and created problems for detecting products not only in the far field outside the workstations, even for the larger, white-colored products, but also inside the workstations, especially those having long triggering volumes and long platforms.

Accordingly, it would be desirable to reliably trigger electro-optical reading of a target by, for example, illuminating the target only when the target to be read is in a well-defined, selected zone in a point-of-transaction workstation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
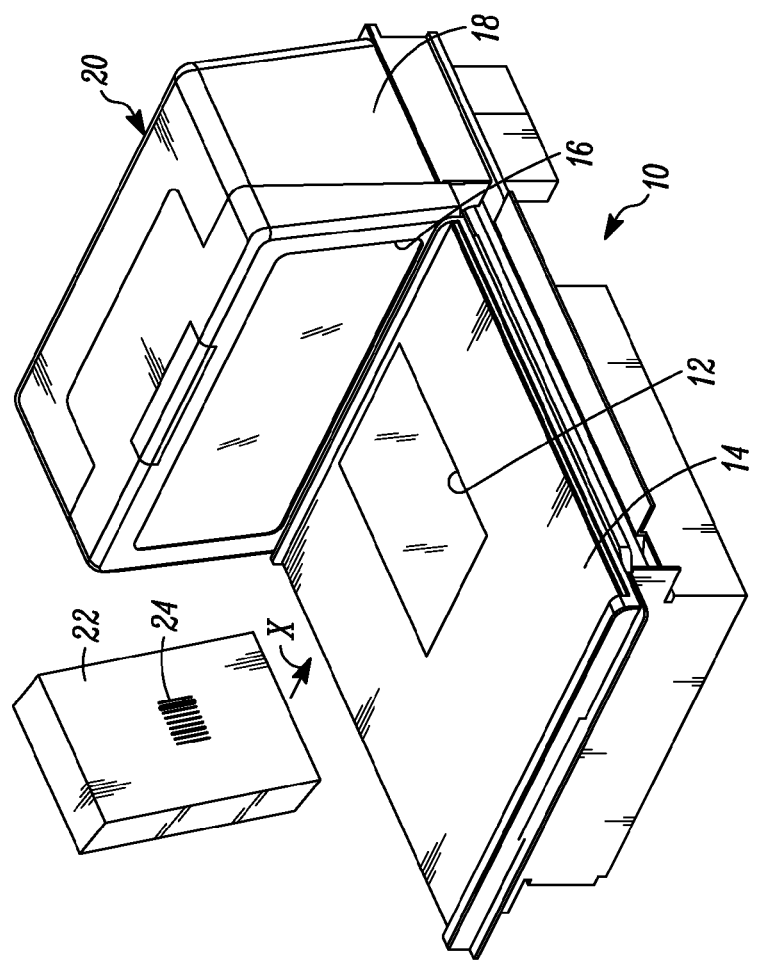
FIG. 1 is a perspective view of a dual window, bi-optical, point-of-transaction workstation for imaging and reading targets on products detected in a selected zone in the workstation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus or workstation, in accordance with one feature of this invention, is operative for processing products associated with targets to be read by image capture. The apparatus includes a housing, a window supported by the housing, a solid-state imager supported by the housing and having an array of image sensors looking at a field of view that extends through the window to a target to be imaged, and a proximity system supported by the housing and operative for detecting a product associated with the target in a selected zone outside the housing. The proximity system has an infrared (IR) emitter for emitting IR light into an IR emission field, and an IR sensor for sensing return IR light within an IR detection field that intersects the IR emission field in the selected zone. The apparatus also includes an energizable illumination system supported by the housing and operative for illuminating the field of view with illumination light over an illumination field, and a controller operatively connected to the imager, the illumination system and the proximity system. The controller energizes the illumination system in response to detection of the product in the selected zone, and processes return illumination light returned from the target and captured in the field of view by the imager.

When configured as a vertical slot scanner, the housing only supports the window as a single upright window in an upright plane. When configured as a bi-optical scanner, the housing has an upright tower that supports the window in an upright plane, and also has a generally horizontal platform that supports an additional window in a generally horizontal plane that intersects the upright plane. The emitted IR light and the return IR light pass through the upright window. The selected zone is outside either the single upright window of the vertical slot scanner, or outside both windows of the bi-optical scanner. In the bi-optical configuration, the IR emitter emits the IR light along an inclined IR emission axis into the IR emission field above the generally horizontal window and the platform, and the IR sensor senses the return IR light along an inclined IR detection axis in the IR detection field above the generally horizontal window and the platform. The inclined axes cross over each other and intersect above the generally horizontal window and the platform. The IR emitter may include one or more light emitting diodes (LEDs).

Advantageously, the size, position and boundaries of at least one of the IR emission field and the IR detection field is adjustable such that the selected zone directly overlies, and is generally coextensive in area with, the generally horizontal window and/or the platform. In one embodiment, such adjustment can be obtained by moving a field stop in the path of one of the IR emission and detection fields. In another embodiment, such adjustment can be obtained by mounting a fixed or a movable field stop in the path of respective IR emission fields emitted from a plurality of IR LEDs, and by selecting one of the IR LEDs to select one of the respective IR emission fields to lie within the selected zone. In still another embodiment, such adjustment can be obtained by moving an optical element, e.g., a wedge prism, in the path of the IR emission field emitted from a single IR LED.

The intersecting IR emission and detection fields above the horizontal window and/or the platform within the workstation, as well as the adjustability of the size, position and boundaries of the intersecting IR emission and detection fields, reduce false triggering by the proximity system, not only by persons outside the workstation, i.e., in the far field, but also by items or parts of persons inside the workstation, but not in the selected zone, e.g., directly overlying the generally horizontal window. Both long and short platforms are readily accommodated. No longer need the output power of the IR emitter, and the sensitivity of the proximity system, be reduced to avoid false triggering.

Turning now to the drawings, reference numeral 10 in FIG. 1 generally identifies a dual window, bi-optical, point-of-transaction workstation typically used by retailers to process transactions involving the purchase of products 22 bearing, or associated with, identifying targets 24 or indicia, such as the UPC symbol described above. The workstation 10 includes a housing 20 having a generally horizontal, preferably rectangular, window 12 located in a generally horizontal plane and supported by a horizontal housing portion or platform 14 of different sizes, and a vertical or generally vertical (referred to as "vertical" or "upright" hereinafter) window 16 that is located in a generally upright plane that intersects the generally horizontal plane and that is supported by a raised housing portion or tower 18. The upright plane may lie in a vertical plane, or be slightly rearwardly or forwardly inclined relative to the vertical plane. The upright, preferably rectangular, window 16 is preferably recessed within its housing portion 18 to resist scratching. The products are passed by a user 26 (see FIGS. 3-4), i.e., an operator or a customer, through a scan volume, which occupies the space at and above the horizontal window 12, and also occupies the space at and in front of the upright window 16.

By way of numerical example, the generally horizontal window 12 measures about four inches in width by about six inches in length, while the generally upright window 16 measures about six inches in width by about eight inches in length. The platform 14 may be long, e.g., on the order of twelve inches as measured in a direction away from and perpendicular to the upright window 16, or short, e.g., on the order of eight inches as measured in a direction away from and perpendicular to the upright window 16.

The workstation 10 includes one or more cameras or solid-state imagers 30 (two shown schematically in FIG. 2), each having a sensor array, preferably a one- or two-dimensional, charge coupled device (CCD) array, or a complementary metal oxide semiconductor (CMOS) array, of image sensors (also known as pixels), preferably of megapixel size, e.g., 1280 pixels wide×960 pixels high, with an imaging field of view diagrammatically shown by arrows and looking out through the windows 12, 16. In a preferred embodiment, the imaging field of each imager 30 measures about 15 degrees by 30 degrees.

Each imager 30 includes, or is associated with, an illuminator or illumination system 32, mounted at the workstation, for illuminating the target 24 with illumination light over an illumination field that overlaps the respecting imaging field. Each illuminator 32 preferably includes one or more light sources, e.g., surface-mounted, light emitting diodes (LEDs), located at each imager 30 to uniformly illuminate the target 24. Each imager 30 includes an imaging lens system for capturing return illumination light reflected and/or scattered from the target 24, and for projecting the captured return light onto the respective sensor array.

Each imager 30 preferably has a shutter, typically a global shutter, that exposes each imager for an exposure time, preferably pre-set for the maximum anticipated exposure time needed to capture the target 24 at the maximum working distance away from each window. By way of example, the maximum exposure time can be set to a value between 400-750 microseconds. Each imager 30 preferably operates at a frame rate of sixty frames per second, each frame lasting about 16.67 milliseconds. The shutter insures that the captured images will not be disturbed by motion of the target 24 relative to the window(s) 12, 16 during the exposure time. A rolling or a mechanical shutter could also be employed. The target 24 and the product 22 can be presented or swiped at speeds up to around 100 inches per second across any part of either window.

In use, the user 26, such as an operator working at a supermarket checkout counter 28 (see FIGS. 3-4), processes a product 22 bearing a target 24 thereon, past the windows 12, 16 by swiping the product, e.g., in the direction of arrow X in FIG. 1, across a respective window in the abovementioned swipe mode, or by presenting and momentarily holding the product 22 at the respective window in the abovementioned presentation mode. The target 24 may located on any of the top, bottom, right, left, front and rear, sides of the product, and at least one, if not more, of the imagers 30 will capture the illumination light reflected, scattered, or otherwise returning from the target 24 through one or both windows. The imagers 30 are preferably looking through the windows at around 45° so that they can each see a side of the product 22 that is generally perpendicular to, as well as generally parallel to, a respective window.

Figure 2:
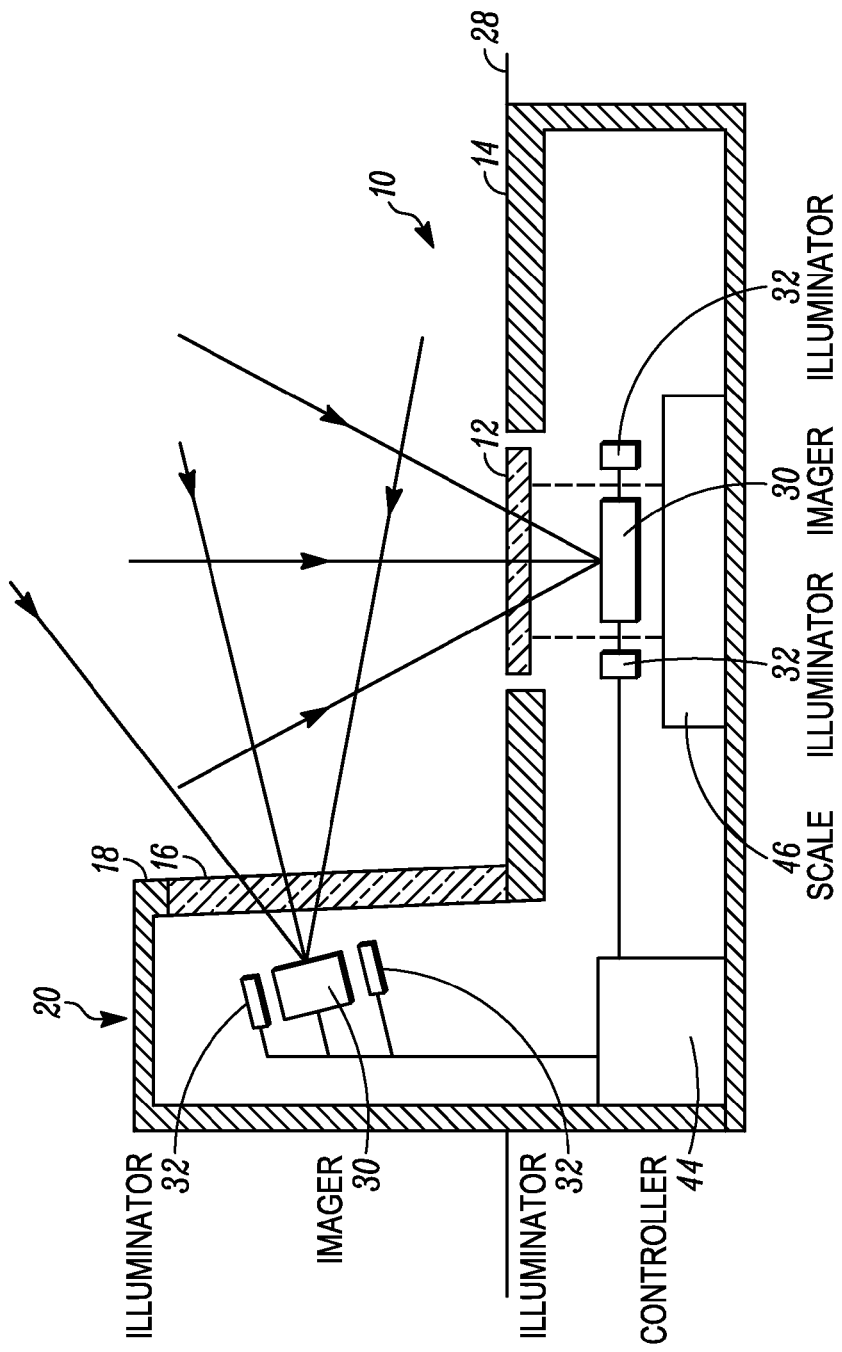
FIG. 2 is a part-sectional view of the workstation of FIG. 1 diagrammatically depicting imagers and illumination systems inside the workstation.

FIG. 2 also schematically depicts that a weighing scale 46 can be mounted at the workstation 10. The generally horizontal window 12 advantageously serves not only as a weighing platter for supporting a product to be weighed, but also allows the return light to pass therethrough. As also schematically shown in FIG. 2, the imagers 30 and their associated illuminators 32 are operatively connected to a programmed microprocessor or controller 44 operative for controlling the operation of these and other components. Preferably, the controller 44 is the same as the one used for processing the captured target images, and for decoding the return light scattered from the target when the target is a symbol.

In operation, the controller 44 sends successive command signals to the illuminators 32 in response to detection of a product in a selected zone in the workstation, as described in detail below, to pulse the LEDs for a short time period of 100 microseconds or less, and successively energizes the imagers 30 to collect light from a target only during said time period, also known as the exposure time period. By acquiring a target image during this brief time period, the image of the target is not excessively blurred even in the presence of relative motion between the imagers and the target.

Although the workstation 10 is illustrated in FIG. 2 as having two imagers 30, one for each window 12, 16, other configurations are within the scope of this invention. As disclosed, for example, in U.S. Pat. No. 8,033,472, the entire contents of which are incorporated herein by reference thereto, multiple imagers can be provided for each window, and an optical system comprised of multiple folding mirrors can be configured to establish multiple intersecting imaging fields of view looking out through each window. In addition, as noted above, the optical system may include optical splitters each operative for splitting the imaging field of view of at least one of the imagers into a plurality of imaging subfields of view, each additional imaging subfield serving to replace an additional imager. These imaging subfields also intersect and look out each window.

Each imaging field or subfield is illuminated in response to detection of the product 22 in a selected zone in the workstation by a proximity system. The controller 44 energizes the illumination system 32 in response to detection of the product 22 in the selected zone, and processes return illumination light returned from the target 24 and captured in the imaging field or subfield by the imager 30.

Figure 3:
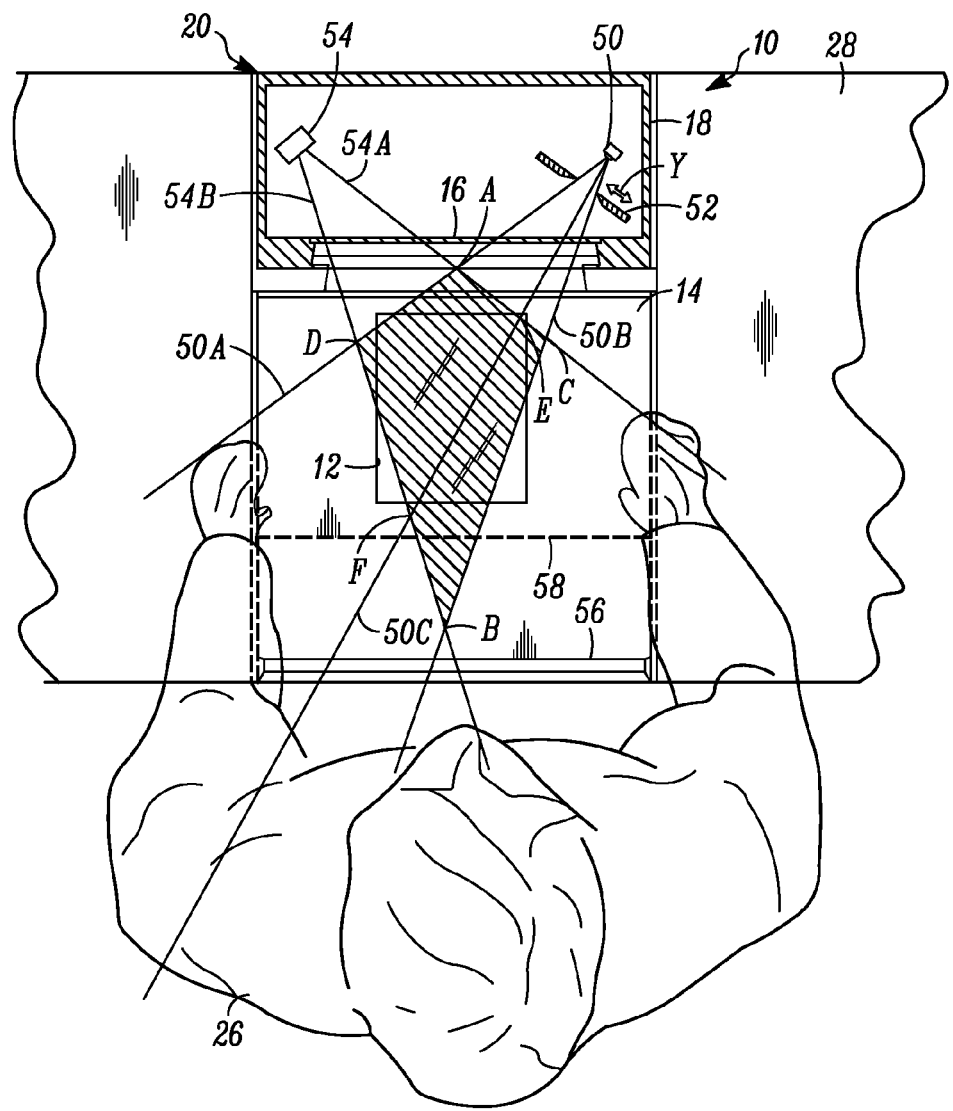
FIG. 3 is a part-sectional, overhead view of the workstation of FIG. 1 depicting one embodiment of a proximity system for detecting the products in the selected zone in the workstation.

A first embodiment of the proximity system is shown in FIG. 3, wherein the imagers 30 and the illuminators 32 have been removed for clarity. The proximity system includes an infrared (IR) emitter 50, preferably comprised of one or more light emitting diodes (LEDs), for emitting IR light into an IR emission field bounded by side boundary edges 50A, 50B, and an IR sensor 54 for sensing return IR light within an IR detection field bounded by side boundary edges 54A, 54B. The emitted IR light has its maximum intensity along an IR emission axis centrally located within the IR emission field. The return IR light has its maximum sensitivity along an IR detection axis centrally located within the IR detection field. The IR axes are inclined and cross over and intersect one another directly in front of the upright window 16. The IR detection field intersects the IR emission field in a common area of intersection (shown by a quadrilateral area highlighted by hatched lines in FIG. 3 and having corners A, B, C, D) to define the selected zone directly in front of the upright window 16. In the illustrated bi-optical configuration, the selected zone is also directly above the generally horizontal window 12 and the platform 14.

Advantageously, the size, position and boundaries of at least one of the IR emission field and the IR detection field is adjustable such that the selected zone directly overlies, and is generally coextensive in area with, the generally horizontal window 12 and/or the platform 14. In the embodiment of FIG. 3, such adjustment can be obtained by moving a field stop 52 in the path of one of the IR emission and detection fields, e.g., in the direction indicated by arrow Y. This adjustment can move the boundary edge 50B to the position indicated by boundary edge 50C, and changes the selected zone to occupy the quadrilateral area having corners A, F, E, D, again directly overlying the generally horizontal window 12 and the platform 14, and again directly in front of the upright window 16.

The intersecting IR emission and detection fields above the horizontal window 12 and/or the platform 14 within the workstation 10, as well as the adjustability of the size, position and boundaries of the intersecting IR emission and detection fields, reduce false triggering by the proximity system, not only by a user 26 outside the workstation 10, i.e., in the far field, but also by items or parts of the user 26 inside the workstation 10, but not in the selected zone A, B, C, D or A, F, E, D, e.g., directly overlying the generally horizontal window 12. As shown in FIG. 3, no part of the user is in either selected zone.

As described above, the platform 14 can be long or short. The long platform 14 is represented in FIG. 3 by a front edge 56 (shown by a solid line), and the short platform 14 is represented in FIG. 3 by a front edge 58 (shown by a dashed line). The selected zone A, B, C, D is advantageously used with the long platform 14. The selected zone A, F, E, D is advantageously used with the short platform 14. Thus, both long and short platforms are readily accommodated, and again false triggering is avoided.

Figure 4:
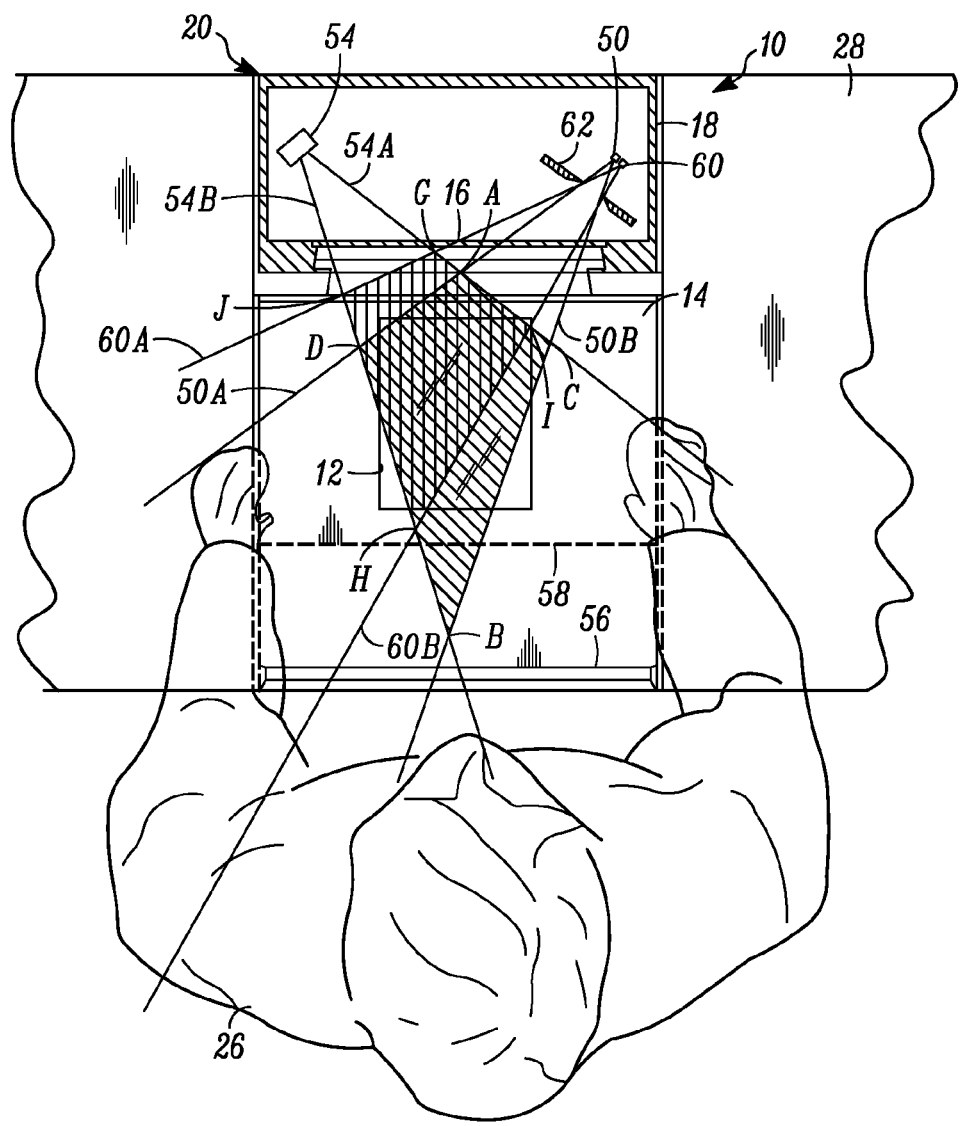
FIG. 4 is a part-sectional, overhead view depicting another embodiment of a proximity system for use in the workstation of FIG. 1.

FIG. 4 depicts another embodiment of a proximity system, and like reference numerals as those used in FIG. 3 have been employed. The embodiment of FIG. 4 differs from that of FIG. 3 by providing another IR LED 60 operative for emitting IR light into an IR emission field bounded by side boundary edges 60A, 60B, and by mounting a fixed field stop 62 in the path of both IR emission fields emitted from both IR LEDs 50, 60. Adjustment of the selected zone is achieved by having the controller 44 select one of the IR LEDs 50, 60 to select one of the respective IR emission fields to lie within the selected zone. Thus, if IR LED 50 is selected, then the selected zone occupies the area A, B, C, D as described above. However, if IR LED 60 is selected, then the selected zone occupies the area G, H, I, J. Again, both long and short platforms are readily accommodated.

Figure 5:
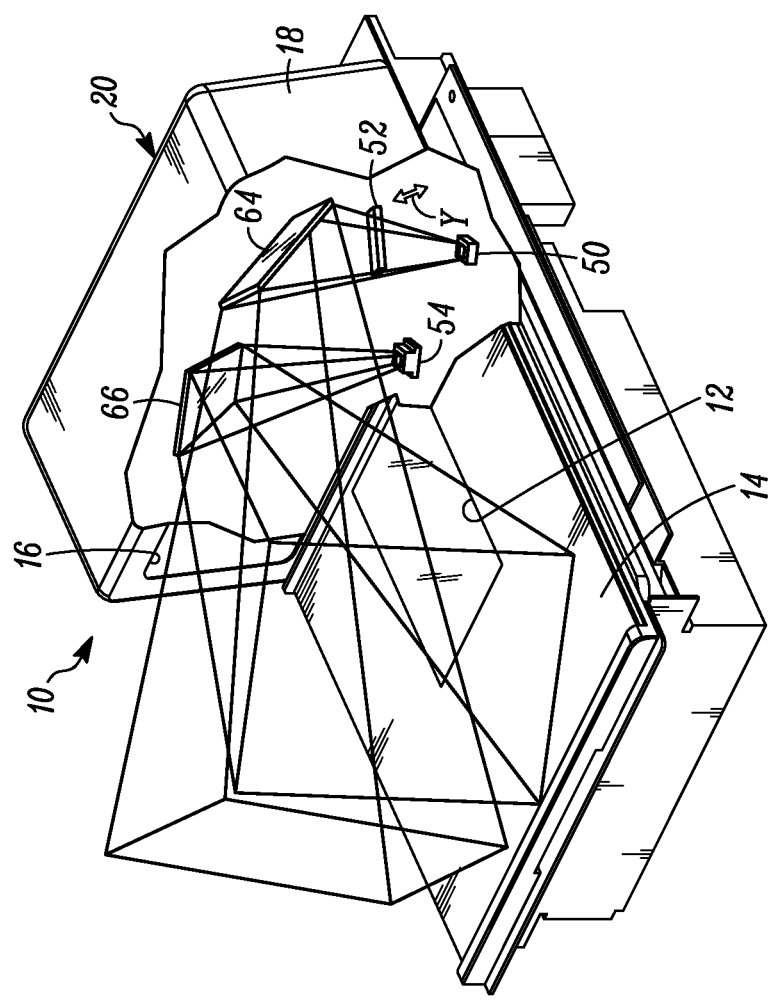
FIG. 5 is a broken-away, perspective view of still another embodiment of a proximity system for use in the workstation of FIG. 1.

FIG. 5 depicts another embodiment of a proximity system that is similar to that shown in FIG. 3, except that the IR emitter 50 and the IR sensor 54 are surface mounted on a generally horizontal main printed circuit board, and a pair of fold mirrors 64, 66 are employed to fold their optical paths. Mirror 64 reflects the emitted IR light out through the upright window 16, and mirror 66 reflects the return IR light returning through the upright window 16 to the IR sensor 54. Mounting all the imagers, the illuminators, the IR emitters, the IR sensors and the controller on the same circuit board facilitates assembly.

Figure 6:
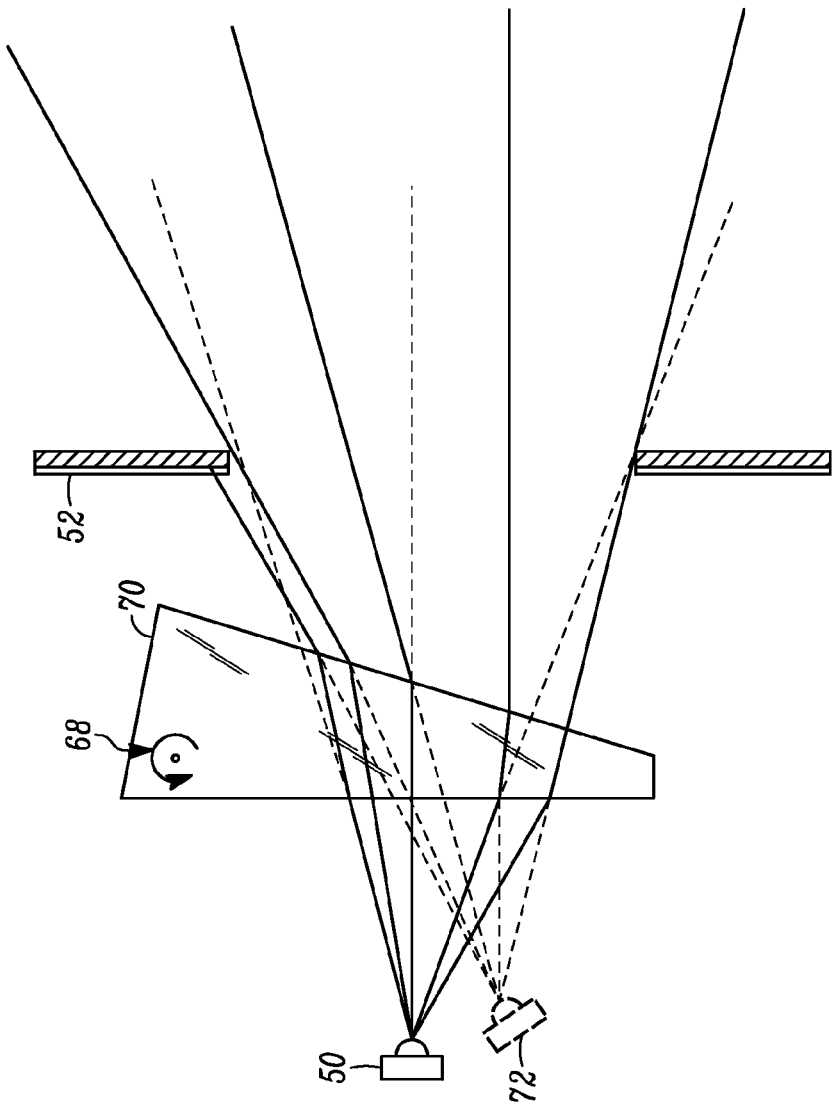
FIG. 6 is a top plan, diagrammatic view of yet another embodiment of a proximity system for use in the workstation of FIG. 1.

FIG. 6 depicts another embodiment of a proximity system that is similar to that shown in FIG. 3, except that adjustment can be obtained by moving an optical element, e.g., a wedge prism 70, in the path of the IR emission field emitted from the single IR LED 50. The prism 70 is rotated about an axis 68 and modifies the IR emission field such that the IR light appears as if it were being emitted from a virtual location, as identified by reference numeral 72. The IR light passing through the fixed field stop 52 has side boundary edges at different locations, thereby enabling the selected zone to occupy differently sized areas.

The provision of a field stop, whether movable or fixed, enables the IR emission field and the IR detection field to have well-defined, sharp boundaries. As a result, items or parts of persons inside the workstation, but not in a selected zone, e.g., directly overlying the generally horizontal window, will not falsely trigger the reading.

It will be understood that each of the elements described above, or two or more together, also may find a useful application in other types of constructions differing from the types described above. For example, the workstation need not be the illustrated dual window or bi-optical workstation described above, but could also be configured either as a vertical slot scanner having a single, generally vertically arranged, upright window.

In accordance with another feature of this invention, a method of processing products associated with targets to be read by image capture, is performed by supporting a window on a housing, by configuring a solid-state imager with an array of image sensors looking at a field of view that extends through the window to a target to be imaged, and by detecting a product associated with the target in a selected zone outside the housing. The detecting is performed by emitting IR light into an IR emission field, and by sensing return IR light within an IR detection field that intersects the IR emission field in the selected zone. The method is further performed by illuminating the field of view with illumination light over an illumination field, in response to detection of the product in the selected zone, by capturing return illumination light from the target, and by processing the captured return illumination light in the field of view.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for processing products associated with targets to be read by image capture, comprising:
   a housing;
   a window supported by the housing;
   a solid-state imager supported by the housing and having an array of image sensors looking at a field of view that extends through the window to a target to be imaged;
   a proximity system supported by the housing and operative to detect a product associated with the target in a selected zone, the proximity system having an infrared (IR) emitter to emit IR light into an IR emission field, and an IR sensor to sense return IR light within an IR detection field that is different from the field of view looked by the solid-state imager to image the target, wherein the IR detection field intersects the IR emission field to form the selected zone that separates from the IR sensor with distal end thereof defined by a side boundary of the IR emission field and with proximal end thereof defined by another side boundary of the IR emission field, the selected zone further separating from the IR emitter with far end thereof defined by a side boundary of the IR detection field and with near end thereof defined by another side boundary of the IR detection field, and at least three corners of the selected zone being in front of the window;
   an energizable illumination system supported by the housing and operative to illuminate the field of view with illumination light over an illumination field; and
   a controller operatively connected to the imager, the illumination system and the proximity system, to energize the illumination system in response to detection of the product in the selected zone by the IR sensor in the proximity system, and to process return illumination light returned from the target and captured in the field of view by the imager.

2. The apparatus of claim 1, wherein the housing supports the window in an upright plane, and wherein the emitted IR light and the return IR light pass through the upright window, and wherein the selected zone is outside the upright window.

3. The apparatus of claim 1, wherein the housing supports the window in an upright plane, and wherein the housing supports an additional window in a generally horizontal plane that intersects the upright plane, and wherein the emitted IR light and the return IR light pass through the upright window, and wherein the selected zone is outside both windows.

4. The apparatus of claim 3, wherein the IR emitter is operative to emit the IR light along an inclined IR emission axis into the IR emission field above the generally horizontal window, and wherein the IR sensor is operative to sense the return IR light along an inclined IR detection axis in the IR detection field above the generally horizontal window, and wherein the inclined axes intersect above the generally horizontal window.

5. The apparatus of claim 1, wherein the IR emitter includes a plurality of IR light emitting diodes (LEDs) supported by the housing.

6. The apparatus of claim 1, and a movable field stop supported by the housing and operative to adjust a boundary of at least one of the IR emission field and the IR detection field.

7. The apparatus of claim 1, wherein the housing supports the window in an upright plane, and wherein the housing supports an additional window in a generally horizontal plane that intersects the upright plane, and a movable field stop supported by the housing and operative to adjust a boundary of at least one of the IR emission field and the IR detection field such that the selected zone directly overlies, and is generally coextensive with, the generally horizontal window.

8. The apparatus of claim 1, wherein the housing supports the window in an upright plane, and wherein the housing has a generally horizontal platform for supporting an additional window in a generally horizontal plane that intersects the upright plane, and a movable field stop supported by the housing and operative to adjust a boundary of at least one of the IR emission field and the IR detection field such that the selected zone directly overlies, and is generally coextensive with, the generally horizontal platform.

9. The apparatus of claim 1, wherein the IR emitter includes a plurality of IR light emitting diodes (LEDs) each operative for emitting respective IR light along respective differently inclined IR emission axes into respective different IR emission fields, and a fixed field stop supported by the housing and located in both of the respective IR emission fields, and wherein the controller is further operative to select one of the IR LEDs to select one of the respective IR emission fields to lie within the selected zone.

10. The apparatus of claim 1, and a movable optical element for directing the IR light emitted by the IR emitter along respective differently inclined IR emission axes into respective different IR emission fields, and a fixed field stop supported by the housing and located in both of the respective IR emission fields, and wherein one of the respective IR emission fields is selected to lie within the selected zone upon movement of the optical element.

11. A method of processing products associated with targets to be read by image capture, comprising:
a window on a housing;
configuring a solid-state imager with an array of image sensors looking at a field of view that extends through the window to a target to be imaged;
detecting a product associated with the target in a selected zone, by emitting IR light into an IR emission field, and by sensing return IR light within an IR detection field that is different from the field of view looked by the solid-state imager for imaging the target, wherein the IR detection field intersects the IR emission field to form the selected zone that separates from the IR sensor with distal end thereof defined by a side boundary of the IR emission field and with proximal end thereof defined by another side boundary of the IR emission field, the selected zone further separating from the IR emitter with far end thereof defined by a side boundary of the IR detection field and with near end thereof defined by another side boundary of the IR detection field, and at least three corners of the selected zone being in front of the window;
illuminating the field of view with illumination light over an illumination field, in response to detection of the product in the selected zone by the IR sensor in the proximity system;
capturing return illumination light from the target; and
processing the captured return illumination light in the field of view.

12. The method of claim 11, wherein the supporting is performed by supporting the window in an upright plane, and wherein the detecting is performed by passing the emitted IR light and the return IR light through the upright window, and by locating the selected zone to be outside the upright window.

13. The method of claim 11, wherein the supporting is performed by supporting the window in an upright plane, and by supporting an additional window in a generally horizontal plane that intersects the upright plane, and wherein the detecting is performed by passing the emitted IR light and the return IR light through the upright window, and by locating the selected zone to be outside both windows.

14. The method of claim 13, wherein the detecting is performed by emitting the IR light along an inclined IR emission axis into the IR emission field above the generally horizontal window, and by sensing the return IR light along an inclined IR detection axis in the IR detection field above the generally horizontal window, and by intersecting the inclined axes above the generally horizontal window.

15. The method of claim 11, wherein the detecting is performed by a plurality of IR light emitting diodes (LEDs).

16. The method of claim 11, and adjusting a boundary of at least one of the IR emission field and the IR detection field by moving a field stop.

17. The method of claim 11, wherein the supporting is performed by supporting the window in an upright plane, and by supporting an additional window in a generally horizontal plane that intersects the upright plane, and adjusting a boundary of at least one of the IR emission field and the IR detection field by moving a field stop such that the selected zone directly overlies, and is generally coextensive with, the generally horizontal window.

18. The method of claim 11, wherein the supporting is performed by supporting the window in an upright plane, and by supporting an additional window by a generally horizontal platform in a generally horizontal plane that intersects the upright plane, and adjusting a boundary of at least one of the IR emission field and the IR detection field by moving a field stop such that the selected zone directly overlies, and is generally coextensive with, the generally horizontal platform.

19. The method of claim 11, wherein the detecting is performed by emitting respective IR light from a plurality of IR light emitting diodes (LEDs) along respective differently inclined IR emission axes into respective different IR emission fields, and by locating a fixed field stop in both of the respective IR emission fields, and by selecting one of the IR LEDs to select one of the respective IR emission fields to lie within the selected zone.

20. The method of claim 11, wherein the detecting is performed by directing the emitted IR light along respective differently inclined IR emission axes into respective different IR emission fields, and by locating a fixed field stop in both of the respective IR emission fields, and by selecting one of the respective IR emission fields to lie within the selected zone upon movement of an optical element.

* * * * *

UNITED STATES PATENT AND TRADEMARK OFFICE
CERTIFICATE OF CORRECTION

| | | |
|---|---|---|
| PATENT NO. | : 9,740,902 B2 | Page 1 of 1 |
| APPLICATION NO. | : 13/308848 | |
| DATED | : August 22, 2017 | |
| INVENTOR(S) | : Carl Wittenberg et al. | |

It is certified that error appears in the above-identified patent and that said Letters Patent is hereby corrected as shown below:

In the Claims

Under Column 11, Claim 11, Line 63 replace "a window on a housing;" with --supporting a window on a housing;--

Signed and Sealed this
Fourteenth Day of August, 2018

Andrei Iancu
*Director of the United States Patent and Trademark Office*